(12) United States Patent
Gao et al.

(10) Patent No.: US 9,389,429 B2
(45) Date of Patent: Jul. 12, 2016

(54) NAKED-EYE 3D BACKLIGHT MODULE, NAKED-EYE 3D DISPLAY DEVICE, AND NAKED-EYE 3D DISPLAY METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Yingqiang Gao, Beijing (CN); Huabin Chen, Beijing (CN); Bin Feng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 145 days.

(21) Appl. No.: 14/517,057

(22) Filed: Oct. 17, 2014

(65) Prior Publication Data
US 2015/0316776 A1 Nov. 5, 2015

(30) Foreign Application Priority Data
May 5, 2014 (CN) .......................... 2014 1 0187534

(51) Int. Cl.
| G02F 1/1335 | (2006.01) |
| G02B 27/22 | (2006.01) |
| H04N 13/04 | (2006.01) |
| G02B 5/04 | (2006.01) |

(Continued)

(52) U.S. Cl.
CPC ............. *G02B 27/2214* (2013.01); *G02B 5/045* (2013.01); *G02B 26/0883* (2013.01); *G02F 1/1368* (2013.01); *G02F 1/133504* (2013.01); *G02F 1/133526* (2013.01); *G02F 1/133603* (2013.01); *G09G 5/10* (2013.01); *H04N 5/18* (2013.01); *H04N 13/0404* (2013.01); *H04N 13/0409* (2013.01); *G02F 2001/133624* (2013.01)

(58) Field of Classification Search
CPC ........... H04N 13/0409; H04N 13/0404; G02B 27/2214; G02B 5/045; G02B 26/0883; G02B 27/0972; G02B 3/005; G02F 1/133526; G02F 1/133603
See application file for complete search history.

(56) References Cited

U.S. PATENT DOCUMENTS

| 2007/0024968 A1* | 2/2007 | Kim ..................... G02B 7/2214 |
| | | 359/463 |
| 2009/0225244 A1* | 9/2009 | Wang ................. G02B 27/2214 |
| | | 349/15 |

(Continued)

*Primary Examiner* — Paul Lee
*Assistant Examiner* — Jia Pan
(74) *Attorney, Agent, or Firm* — Kinney & Lange, P.A.

(57) ABSTRACT

Disclosed are a naked-eye 3D backlight module, a naked-eye 3D display device, and a naked-eye 3D display method. The naked-eye 3D display device comprises: a light emitting diode (LED) sequential circuit board comprising a plurality of sets of LED backlight sources; a plurality of convex lenses provided in one-to-one correspondence with the LED units; a plurality of polygonal prisms provided in one-to-one correspondence with the LED backlight sources; a thin film transistor liquid crystal display (TFT-LCD) having a refresh frequency the same as a sequential frequency of the LED backlight sources and configured to control transmissions of the n parallel light beams; and a multiple-viewing-angle parallax barrier configured to form the n parallel light beams, which are respectively oriented in the n directions after passing through the TFT-LCD, into an n-viewpoint area display in space. A three-dimensional (3D) viewing angle for the human eyes is greatly enlarged.

15 Claims, 3 Drawing Sheets

(51) Int. Cl.
*G02B 26/08* (2006.01)
*G02F 1/1368* (2006.01)
*G09G 5/10* (2006.01)
*H04N 5/18* (2006.01)

(56) References Cited

U.S. PATENT DOCUMENTS

| | | | | |
|---|---|---|---|---|
| 2010/0097449 A1* | 4/2010 | Jeong | ............... | G02B 27/2214 348/59 |
| 2010/0157026 A1* | 6/2010 | Reichelt | ............... | G02B 26/005 348/51 |
| 2011/0164318 A1* | 7/2011 | Yun | ............... | G02B 27/2214 359/463 |
| 2011/0221999 A1* | 9/2011 | Shiau | ............... | G02B 3/005 349/62 |
| 2012/0307181 A1* | 12/2012 | Fang | ............... | G02F 1/133606 349/64 |
| 2013/0215364 A1* | 8/2013 | Huang | ............... | G02F 1/133603 349/69 |

* cited by examiner

NAKED-EYE 3D BACKLIGHT MODULE, NAKED-EYE 3D DISPLAY DEVICE, AND NAKED-EYE 3D DISPLAY METHOD

CROSS-REFERENCE TO RELATED APPLICATION

This application claims the benefit of Chinese Patent Application No. 201410187534.X filed on May 5, 2014 in the State Intellectual Property Office of China, the whole disclosure of which is incorporated herein by reference.

BACKGROUND OF THE INVENTION

1. Field of the Invention

Embodiments of the present invention relate to a technical field of three dimensional (3D) display, and particularly to a naked-eye 3D backlight module, a naked-eye 3D display device, and a naked-eye 3D display method.

2. Description of the Related Art

FIG. 1 shows a specific structure of a conventional naked-eye 3D display device. As shown in FIG. 1, the display device comprises a thin film transistor liquid crystal display (TFT-LCD), and a parallax barrier. The thin film transistor liquid crystal display comprises a plurality of sets of light emitting diodes, and each set of light emitting diodes comprises a left light emitting diode and a right light emitting diode. A 3D picture can be seen by naked eyes only in a small middle region after light from the liquid crystal display passes through the parallax barrier.

SUMMARY OF THE INVENTION

At least one object of the embodiment of the present invention is to provide a naked-eye 3D backlight module, a naked-eye 3D display device, and a naked-eye 3D display method, by which range of a viewing angle of the display device is extended.

According to embodiments of the present invention, there is provided a naked-eye 3D backlight module, comprising:

a light emitting diode (LED) sequential circuit board comprising a plurality of sets of LED backlight sources, each of the sets of the LED backlight sources comprising n LED units, wherein n is an even integer greater than or equal to 4;

a plurality of convex lenses provided in one-to-one correspondence with the LED units, wherein each of the convex lenses is configured to converge a light beam emitted from a corresponding LED unit of the LED units into a parallel light beam, and the parallel light beams converged by all the convex lenses are oriented in a same direction;

a plurality of polygonal prisms provided in one-to-one correspondence with the sets of the LED backlight sources, wherein each of the plurality of polygonal prisms has n refracting sides and is configured to refract the parallel light beams oriented in the same direction after passing through the convex lenses into n parallel light beams respectively oriented in n directions;

a thin film transistor liquid crystal display (TFT-LCD) having a refresh frequency the same as a sequential frequency of the LED backlight sources and configured to control transmissions of the n parallel light beams respectively oriented in the n directions after passing through each of the polygonal prisms; and a multiple-viewing-angle parallax barrier configured to form the n parallel light beams, which are respectively oriented in the n directions after passing through the TFT-LCD, into an n-viewpoint area display in space.

According to embodiments of the present invention, there is further provided a naked-eye 3D display device comprising the abovementioned backlight module.

According to embodiments of the present invention, there is further provided a naked-eye 3D display method comprising steps of:

emitting light beams from a plurality of sets of LED backlight sources, wherein each of the sets of the LED backlight sources comprises n LED units, wherein n is an even integer greater than or equal to 4;

converging the light beams emitted from the LED units into parallel light beams oriented in a same direction;

refracting the parallel light beams oriented in the same direction into n parallel light beams respectively oriented in n directions;

controlling transmissions of the n parallel light beams respectively oriented in the n directions by a TFT-LCD having a refresh frequency the same as a sequential frequency of the LED backlight sources; and forming the n parallel light beams, which are respectively oriented in the n directions after passing through the TFT-LCD, into an n-viewpoint area display in space.

DETAILED DESCRIPTION OF THE EMBODIMENTS

Figure 1:
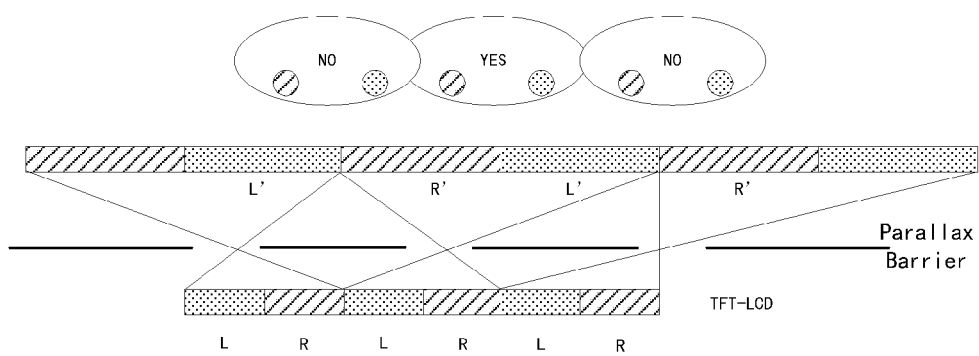
FIG. 1 is a schematic diagram showing a structure of a conventional two-viewpoint area display.

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided a naked-eye 3D backlight module. The naked-eye 3D backlight module comprises:

a light emitting diode (LED) sequential circuit board comprising a plurality of sets of LED backlight sources, wherein each of the sets of the LED backlight sources comprises n LED units, wherein n is an even integer greater than or equal to 4;

a plurality of convex lenses provided in one-to-one correspondence with the LED units, wherein each of the convex lenses is configured to converge a light beam emitted from a corresponding LED unit of the LED units into a parallel light beam, and the parallel light beams converged by all the convex lenses are oriented in a same direction;

a plurality of polygonal prisms provided in one-to-one correspondence with the sets of the LED backlight sources, wherein each of the plurality of polygonal prisms has n refracting sides and is configured to refract the parallel light beams oriented in the same direction after passing through the convex lenses into n parallel light beams respectively oriented in n directions;

a thin film transistor liquid crystal display (TFT-LCD) having a refresh frequency the same as a sequential frequency of the LED backlight sources and configured to control transmissions of the n parallel light beams respectively oriented in the n directions after passing through each of the polygonal prisms; and a multiple-viewing-angle parallax barrier configured to form the n parallel light beams, which are respectively oriented in the n directions after passing through the TFT-LCD, into an n-viewpoint area display in space.

According to a general concept of the present invention, there is provided a naked-eye 3D display device comprising the abovementioned backlight module.

According to a general concept of the present invention, there is provided a naked-eye 3D display method comprising steps of:

emitting light beams from a plurality of sets of LED backlight sources, each of the sets of the LED backlight sources comprising n LED units, wherein n is an even integer greater than or equal to 4;

converging the light beams emitted from the LED units into parallel light beams oriented in a same direction;

refracting the parallel light beams oriented in the same direction into n parallel light beams respectively oriented in n directions;

controlling transmissions of the n parallel light beams respectively oriented in the n directions by a TFT-LCD having a refresh frequency the same as a sequential frequency of the LED backlight sources; and forming the n parallel light beams, which are respectively oriented in the n directions after passing through the TFT-LCD, into an n-viewpoint area display in space.

With the naked-eye 3D backlight module, the naked-eye 3D display device, and the naked-eye 3D display method according to embodiments of the present invention, a three-dimensional picture can be seen by human eyes in a plurality of areas, under the action of the polygonal prisms as well as the multiple-viewing-angle parallax barrier, hence, a three-dimensional viewing angle for the human eyes is greatly enlarged. Accordingly, the naked-eye 3D backlight module, the naked-eye 3D display device, and the naked-eye 3D display method according to the embodiments of the present invention have a high use value.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
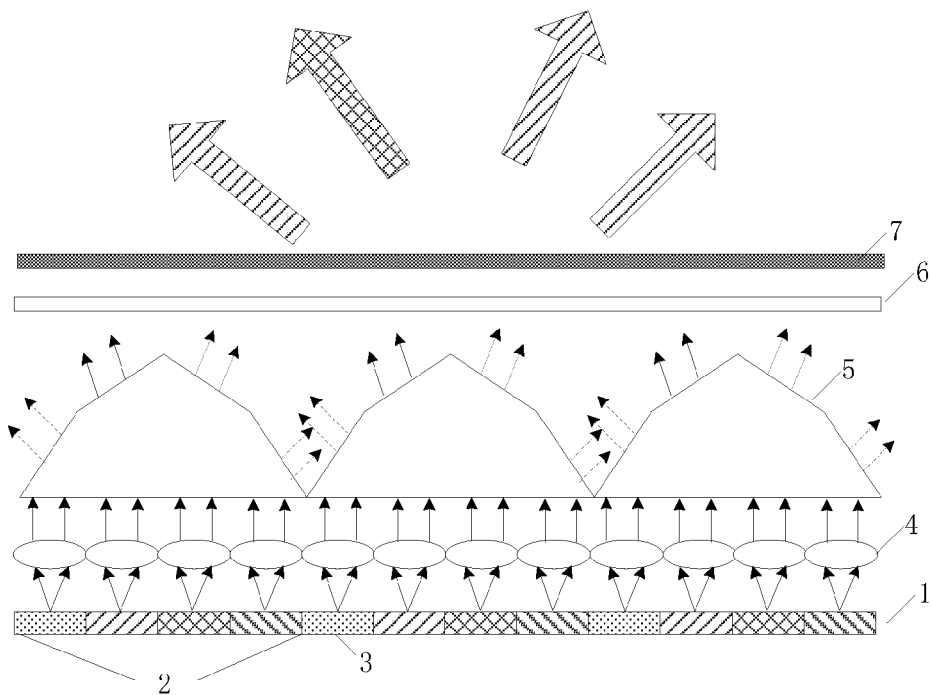
FIG. 2 is a schematic diagram showing a structure of a naked-eye 3D backlight module according to an embodiment of the present invention.

According to embodiments of the present invention, there is provided a naked-eye 3D backlight module. The naked-eye 3D backlight module comprises:

a light emitting diode (LED) sequential circuit board 1 comprising a plurality of sets of LED backlight sources 2, wherein each of the sets of the LED backlight sources 2 comprises n LED units 3, and n is an even integer greater than or equal to 4 (referring to FIG. 2 which shows an embodiment in which n is 4);

a plurality of convex lenses 4 provided in one-to-one correspondence with the LED units 3, wherein each of the convex lenses 4 is configured to converge a light beam emitted from a corresponding LED unit 3 into a parallel light beam, and the parallel light beams converged by all the convex lenses 4 are oriented in a same direction;

a plurality of polygonal prisms 5 provided in one-to-one correspondence with the sets of LED backlight sources 2, wherein each of the plurality of polygonal prisms 5 has n refracting sides and is configured to refract the parallel light beams oriented in the same direction after passing through the convex lenses 4 into n parallel light beams respectively oriented in n directions;

a thin film transistor liquid crystal display (TFT-LCD) 6 having a refresh frequency the same as a sequential frequency of the LED backlight sources 2 and configured to control transmissions of the n parallel light beams respectively oriented in the n directions after passing through each of the polygonal prisms 5; and a multiple-viewing-angle parallax barrier 7 configured to form the n parallel light beams, which are respectively oriented in the n directions after passing through the TFT-LCD 6, into an n-viewpoint area display in space.

Figure 3:
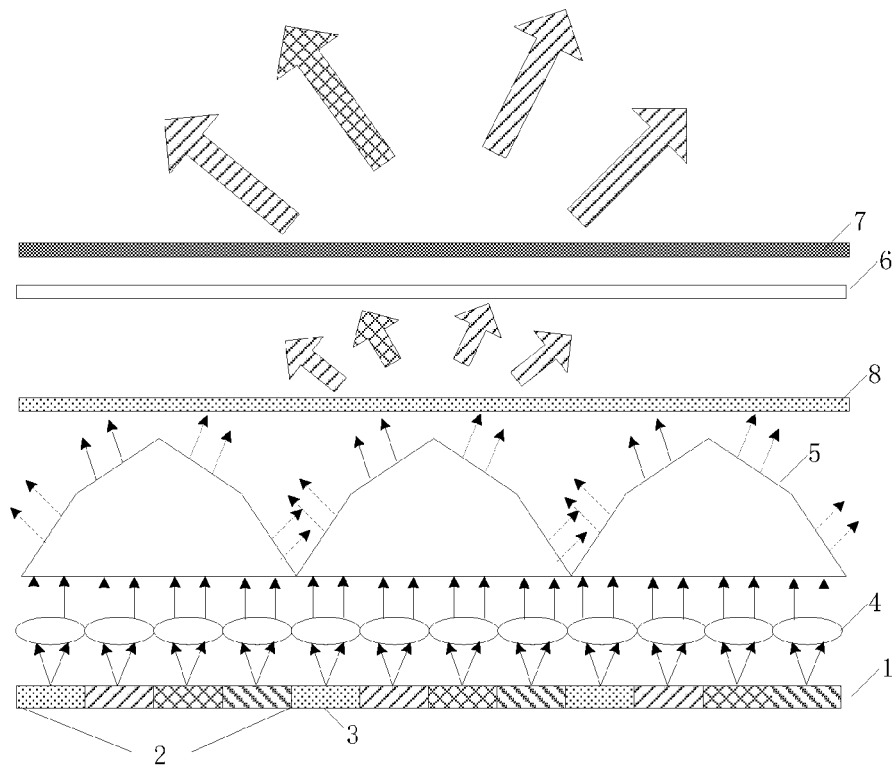
FIG. 3 is a schematic diagram showing an exemplary structure of the naked-eye 3D backlight module according to an embodiment of the present invention.

In some embodiments, in order that the n parallel light beams respectively oriented in the n directions are uniformly diffused to form n viewpoint areas, the naked-eye 3D backlight module further comprises a diffusion sheet 8 provided between the polygonal prisms 5 and the TFT-LCD 6, as shown in FIG. 3.

In some embodiments, the n LED units 3 emit the light beams at the sequential frequency of at least 240 Hz.

Figure 4:
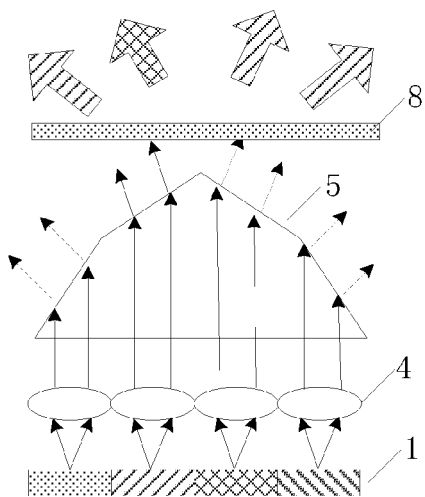
FIG. 4 is a schematic diagram showing a refracted light path of a bidirectional prism for a 4-viewpoint area naked-eye 3D display according to an embodiment of the present invention.
Figure 5:
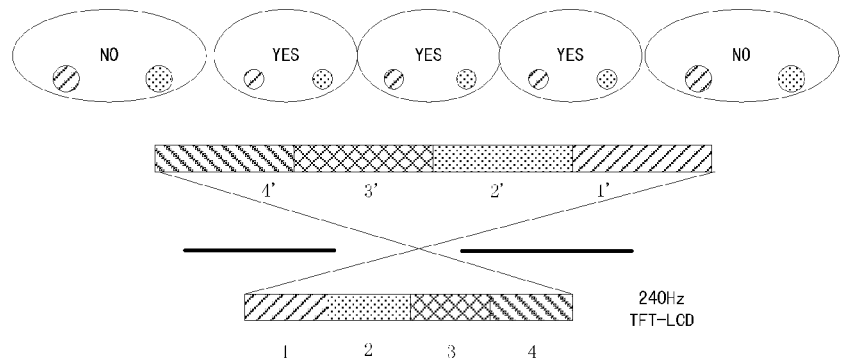
FIG. 5 is a schematic diagram of display areas of a 4-viewpoint area naked-eye 3D display according to an embodiment of the present invention.

In some embodiments, if the naked-eye 3D backlight module according to the embodiment of the present invention is in the form of a 4-viewpoint area naked-eye 3D display, n is 4, and both the sequential frequency of the LED backlight sources 2 and the refresh frequency of the TFT-LCD 6 may be 240 Hz. Furthermore, if n is 4, the polygonal prism is a prism with four refracting sides, i.e., a bidirectional prism. After 4-viewpoint three-dimensional backlight beams emitted from each LED backlight source 2 are converged by the convex lenses, they can be refracted, by the bidirectional prism 4, into parallel light beams respectively oriented in 4 directions, so as to form 4 viewpoint areas, as shown in FIG. 4. In the finally formed 4-viewpoint area display, as shown in FIG. 5, whether human eyes are located between the areas 4' and 3', between the areas 3' and 2', or between the areas 2' and 1', a 3D display effect can be seen. Therefore, a three-dimensional viewing angle of the naked eyes is greatly enlarged, compared with the two-viewpoint area display shown in FIG. 1.

In some embodiments, if the naked-eye 3D backlight module according to the embodiment of the present invention is in the form of a 8-viewpoint area naked-eye 3D display, n is 8, and both the sequential frequency of the LED backlight sources 2 and the refresh frequency of the TFT-LCD 6 may be 480 Hz.

In some embodiments, the polygonal prism has a shape constructed by cutting away a part of a prism having 2n sides by a plane passing through two opposite edges of the prism having 2n sides. A cross section of the prism having 2n sides may have a shape of regular polygon or any other polygon.

In accordance with an embodiment of the present invention, there is also provided a naked-eye 3D display device comprising the abovementioned backlight module.

Figure 6:
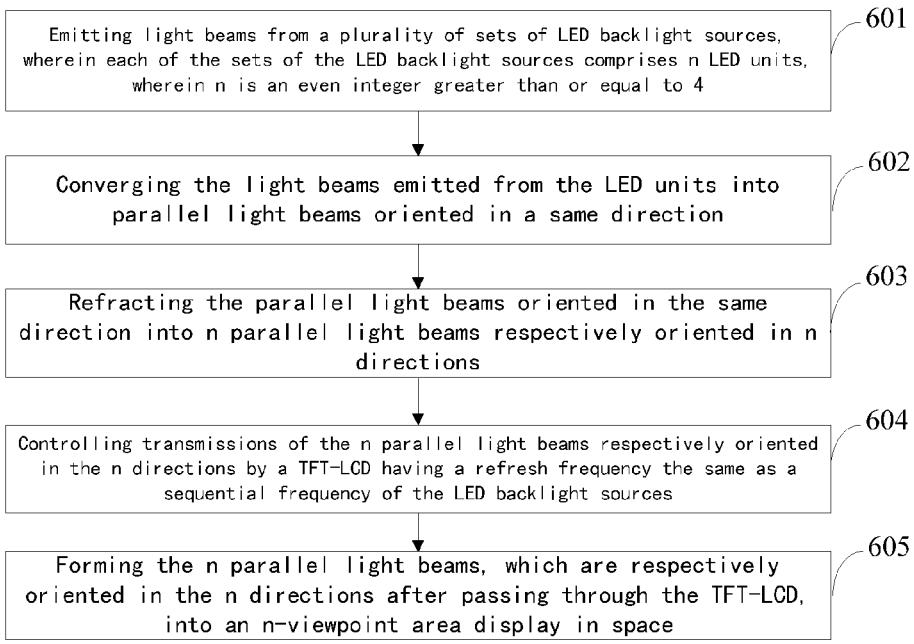
FIG. 6 is a schematic flow diagram of a naked-eye 3D display method according to an embodiment of the present invention.

In accordance with an embodiment of the present invention, there is also provided a naked-eye 3D display method. As shown in FIG. 6, the method comprises:

step 601: emitting light beams from a plurality of sets of LED backlight sources, wherein each of the sets of the LED backlight sources comprises n LED units, and n is an even integer greater than or equal to 4;

step 602: converging the light beams emitted from the LED units into parallel light beams oriented in a same direction;

step 603: refracting the parallel light beams oriented in the same direction into n parallel light beams respectively oriented in n directions, for example by a polygonal prism;

step 604: controlling transmissions of the n parallel light beams respectively oriented in the n directions by a TFT-LCD having a refresh frequency the same as a sequential frequency of the LED backlight sources; and step 605: forming the n parallel light beams, which are respectively oriented in the n directions after passing through the TFT-LCD, into an n-viewpoint area display in a space, wherein the n LED units may emit the light beams at the sequential frequency of at least 240 Hz.

In some embodiments, in order that the n parallel light beams respectively oriented in the n directions are uniformly diffused to form n viewpoint areas, the method may further comprise: uniformly diffusing the n parallel light beams respectively oriented in the n directions by a diffusion sheet, after the step of refracting the parallel light beams and before the step of controlling the transmissions of the n parallel light beams.

In some embodiments, if the method according to the embodiment of the present invention is in the form of a 4-viewpoint area naked-eye 3D display, n is 4 and both the sequential frequency of the three-dimensional LED backlight sources and the refresh frequency of the TFT-LCD may be 240 Hz.

In some embodiments, if the method according to the embodiment of the present invention is in the form of a 8-viewpoint area naked-eye 3D display, n is 8 and both the sequential frequency of the three-dimensional LED backlight sources and the refresh frequency of the TFT-LCD may be 480 Hz.

With the naked-eye 3D backlight module, the naked-eye 3D display device, and the naked-eye 3D display method according to embodiments of the present invention, a three-dimensional picture can be seen by human eyes in a plurality of areas, under the action of the polygonal prisms as well as the multiple-viewing-angle parallax barrier, hence, a three-dimensional viewing angle for the human eyes is greatly enlarged. Accordingly, the naked-eye 3D backlight module, the naked-eye 3D display device, and the naked-eye 3D display method according to the embodiments of the present invention have a high use value.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:

1. A naked-eye 3D display device, comprising:
   a light emitting diode (LED) sequential circuit board comprising a plurality of sets of LED backlight sources, wherein each of the sets of the LED backlight sources comprises n LED units, wherein n is an even integer greater than or equal to 4;
   a plurality of convex lenses provided in one-to-one correspondence with the LED units, wherein each of the convex lenses is configured to converge a light beam emitted from a corresponding LED unit of the LED units into a parallel light beam, and the parallel light beams converged by all the convex lenses are oriented in a same direction;
   a plurality of polygonal prisms provided in one-to-one correspondence with the sets of the LED backlight sources, wherein each of the plurality of polygonal prisms has n refracting sides and is configured to refract the parallel light beams oriented in the same direction after passing through the convex lenses into n parallel light beams respectively oriented in n directions;
   a thin film transistor liquid crystal display (TFT-LCD) having a refresh frequency the same as a sequential frequency of the LED backlight sources and configured to control transmissions of the n parallel light beams respectively oriented in the n directions after passing through each of the polygonal prisms; and
   a multiple-viewing-angle parallax barrier configured to form the n parallel light beams, which are respectively oriented in the n directions after passing through the TFT-LCD, into an n-viewpoint area display in space.

2. The naked-eye 3D backlight module of claim 1, further comprising:
   a diffusion sheet provided between the polygonal prisms and the TFT-LCD and configured to uniformly diffuse the n parallel light beams respectively oriented in the n directions.

3. The naked-eye 3D backlight module of claim 1, wherein:
   n is 4, and both the sequential frequency of the LED backlight sources and the refresh frequency of the TFT-LCD are 240 Hz.

4. The naked-eye 3D backlight module of claim 1, wherein:
   n is 8, and both the sequential frequency of the LED backlight sources and the refresh frequency of the TFT-LCD are 480 Hz.

5. The naked-eye 3D backlight module of claim 1, wherein:
   the n LED units are configured to emit the light beams at the sequential frequency of at least 240 Hz.

6. The naked-eye 3D backlight module of claim 1, wherein:
   the polygonal prism has a shape constructed by cutting away a part of a prism having 2n sides by a plane passing through two opposite edges of the prism having the 2n sides.

7. The naked-eye 3D backlight module of claim 6, wherein:
   a cross section of the prism having the 2n sides has a shape of regular polygon.

8. A naked-eye 3D display method of the naked-eye 3D display device according to claim 1, comprising steps of:
   emitting light beams from a plurality of sets of LED backlight sources, wherein each of the sets of the LED backlight sources comprises n LED units, wherein n is an even integer greater than or equal to 4;
   converging the light beams emitted from the LED units into parallel light beams oriented in a same direction;
   refracting the parallel light beams oriented in the same direction into n parallel light beams respectively oriented in n directions;
   controlling transmissions of the n parallel light beams respectively oriented in the n directions by a thin film transistor liquid crystal display (TFT-LCD) having a refresh frequency the same as a sequential frequency of the LED backlight sources; and forming the n parallel light beams, which are respectively oriented in the n directions after passing through the TFT-LCD, into an n-viewpoint area display in space.

9. The naked-eye 3D display method of claim 8, wherein:

the method, after the step of refracting the parallel light beams and before the step of controlling the transmissions of the n parallel light beams, further comprises:

uniformly diffusing the n parallel light beams respectively oriented in the n directions by a diffusion sheet.

10. The naked-eye 3D display method of claim 8, wherein:

n is 4, and both the sequential frequency of the LED backlight sources and the refresh frequency of the TFT-LCD are 240 Hz.

11. The naked-eye 3D display method of claim 8, wherein:

n is 8, and both the sequential frequency of the LED backlight sources and the refresh frequency of the TFT-LCD are 480 Hz.

12. The naked-eye 3D display method of claim 8, wherein:

the n LED units are configured to emit the light beams at the sequential frequency of at least 240 Hz.

13. The naked-eye 3D display method of claim 8, wherein:

the parallel light beams oriented in the same direction are refracted into the n parallel light beams respectively oriented in the n directions, by a polygonal prism.

14. The naked-eye 3D display method of claim 13, wherein:

the polygonal prism has a shape constructed by cutting away a part of a prism having 2n sides by a plane passing through two opposite edges of the prism having the 2n sides.

15. The naked-eye 3D display method of claim 14, wherein:

a cross section of the prism having the 2n sides has a shape of regular polygon.

\* \* \* \* \*